(12) United States Patent
Yamada et al.

(10) Patent No.: US 9,948,811 B2
(45) Date of Patent: Apr. 17, 2018

(54) ILLUMINATING DEVICE, IMAGE READING APPARATUS AND IMAGE FORMING APPARATUS

(71) Applicant: Sharp Kabushiki Kaisha, Osaka (JP)

(72) Inventors: Yoshihisa Yamada, Osaka (JP); Mitsuharu Yoshimoto, Osaka (JP); Yasuhiro Suto, Osaka (JP); Kenji Nakanishi, Osaka (JP); Shohichi Fukutome, Osaka (JP); Hisashi Yamanaka, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 15/171,350

(22) Filed: Jun. 2, 2016

(65) Prior Publication Data

US 2016/0352954 A1   Dec. 1, 2016

Related U.S. Application Data

(63) Continuation of application No. 14/298,357, filed on Jun. 6, 2014, now Pat. No. 9,383,082, which is a
(Continued)

(30) Foreign Application Priority Data

Oct. 30, 2008   (JP) ................... 2008-280075

(51) Int. Cl.
*G03G 15/04*   (2006.01)
*H04N 1/028*   (2006.01)
(Continued)

(52) U.S. Cl.
CPC ....... *H04N 1/02825* (2013.01); *F21V 29/505* (2015.01); *F21V 29/70* (2015.01);
(Continued)

(58) Field of Classification Search
CPC ....... H04N 1/02825; H04N 2201/0094; H04N 2201/0246; H04N 1/02885;
(Continued)

(56) References Cited

U.S. PATENT DOCUMENTS 3,428,397 A * 2/1969 Elmer ............... G03B 27/542
                                                                      399/221
5,207,504 A   5/1993 Swift et al.
(Continued)

FOREIGN PATENT DOCUMENTS

JP   09-007414 A   1/1997
JP   10-190960 A   7/1998
(Continued)

OTHER PUBLICATIONS

International Search Report for corresponding International Application No. PCT/JP2009/067624 dated Nov. 17, 2009.
Co-pending U.S. Appl. No. 14/298,357, filed Jun. 6, 2014.

*Primary Examiner* — Walter L Lindsay, Jr.
*Assistant Examiner* — Ruth Labombard
(74) *Attorney, Agent, or Firm* — Renner Otto Boisselle & Sklar, LLP

(57) ABSTRACT

An illuminating device (210) according to an embodiment of the invention included in an image reading apparatus (100) and an image forming apparatus (D) includes light source portions (211a1), (211b1), (211a2) and (211b2), light-guiding members (213a) and (213b) for illuminating an illumination target (G) from an elongated light emitting face (M) that extends in a longitudinal direction (Y), by guiding light from the light source portions, and holding members (216a) and (216b) for holding the light-guiding members. The holding members include holding portions (2161a) and (2161b) for removably holding the light-guiding members, and tilted portions (2162a) and (2162b) that reflect light emitted from the light emitting face (M), the tilted portions
(Continued)

extending from a front end on the light emitting face (M) side of the holding portions, obliquely widening with increasing distance from the light-guiding members.

33 Claims, 10 Drawing Sheets

Related U.S. Application Data continuation of application No. 13/062,745, filed as application No. PCT/JP2009/067624 on Oct. 9, 2009, now Pat. No. 8,787,799.

(51) Int. Cl.

| F21V 29/89 | (2015.01) |
|---|---|
| F21V 29/70 | (2015.01) |
| G03B 27/54 | (2006.01) |
| G03G 15/32 | (2006.01) |
| F21V 8/00 | (2006.01) |
| F21V 29/505 | (2015.01) |
| G03G 15/043 | (2006.01) |

(52) U.S. Cl.
CPC ............ *F21V 29/89* (2015.01); *G02B 6/0001* (2013.01); *G02B 6/0055* (2013.01); *G02B 6/0085* (2013.01); *G03B 27/54* (2013.01); *G03G 15/04036* (2013.01); *G03G 15/326* (2013.01); *H04N 1/02815* (2013.01); *H04N 1/02835* (2013.01); *H04N 1/02885* (2013.01); *G03G 15/0435* (2013.01); *H04N 2201/0094* (2013.01); *H04N 2201/02462* (2013.01)

(58) Field of Classification Search
CPC .......... H04N 1/02835; H04N 1/02815; G02B 6/0085; G02B 6/0055; G02B 6/0001; F21V 29/70; F21V 29/89; F21V 29/505; G03B 27/54; G03G 15/326; G03G 15/0435; G03G 15/04036
USPC ........................................................ 399/221
See application file for complete search history.

(56) References Cited

U.S. PATENT DOCUMENTS

| 6,259,082 | B1 | 7/2001 | Fujimoto et al. |
| 8,787,799 | B2 | 7/2014 | Yamada et al. |
| 2009/0034285 | A1 | 2/2009 | Lee et al. |
| 2009/0201675 | A1 | 8/2009 | Onishi et al. |
| 2009/0294630 | A1 | 12/2009 | Saito et al. |

FOREIGN PATENT DOCUMENTS

| JP | 11-055464 A | 2/1999 |
| JP | 2008-035036 | 2/2008 |
| JP | 2008-172562 | 7/2008 |
| WO | WO 2006/137263 A1 | 12/2006 |

* cited by examiner

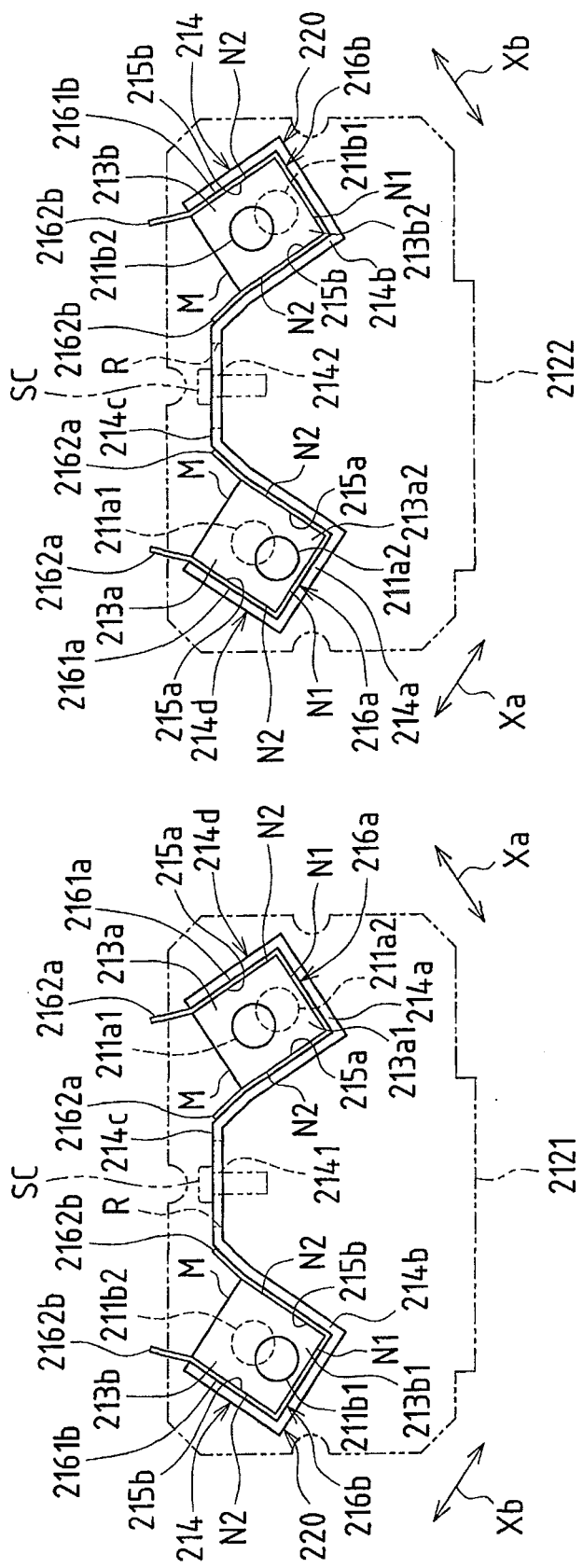

US 9,948,811 B2

ILLUMINATING DEVICE, IMAGE READING APPARATUS AND IMAGE FORMING APPARATUS

TECHNICAL FIELD

The present invention relates to an illuminating device that illuminates an illumination target, an image reading apparatus and an image forming apparatus.

BACKGROUND ART

Generally, in image reading apparatuses provided in image forming apparatuses such as a copier, fax machine or digital multi-functional peripheral, or image reading apparatuses contacted to a computer via communication means such as a network, light reflected from a document serving as the illumination target that is illuminated by an illuminating device including a light source for illuminating the document is read as the document image.

For example, a conventional image reading apparatus includes a light source unit in which an illuminating device including a light source portion (for example, a bar-shaped light source such as a halogen lamp or xenon lamp, or a light source constituted by a light-emitting element such as light-emitting diodes (LEDs)) for illuminating a document placed on a platen glass and a first mirror are arranged, second and third mirrors, an imaging lens and an imaging element (for example, a line sensor such as a CCD (Charge Coupled Device)). Many of such image reading apparatuses are configured to read a document image by causing reflected light from the document illuminated by a light source portion to pass through a slit provided in a base such as a frame body of the illuminating device, and to travel via a first mirror, a second mirror, a third mirror and then an imaging lens to form an image on an imaging element.

For example, such image reading apparatuses are used as image reading means in the case where information of the image formed on the imaging element such as a CCD is converted to electric signals to be subjected to image processing, and the processed electric signals are transferred to an image forming apparatus that performs printing based on the image information, or in the case where the electric signals are sent to a computer (for example, personal computer) connected to a network.

Conventionally, an illuminating device provided in an image reading apparatus is known which includes a light source portion, an elongated and translucent light-guiding member that illuminates an illumination target from an elongated light emitting face extending along a longitudinal direction of the light-guiding member by guiding light from the light source portion, and a holding member that holds the light-guiding member.

Specifically, an illuminating device has been disclosed which includes a light-emitting body formed by arranging a plurality of light-emitting elements in a line, which reflects light from the light-emitting element with a reflecting member, and emits the reflected light toward the reading range of the document via the light-guiding member held by the holding member (for example, see FIGS. 7 to 10 and FIG. 13 of Patent Document 1 cited below).

PRIOR ART DOCUMENT

Patent Document

Patent Document 1: JP2008-172562A

DISCLOSURE OF INVENTION

Problems to be Solved by the Invention

However, image reading apparatuses as disclosed in Patent Document 1 have the following problems.

That is, since the light-guiding member is fixed to the holding member, it is difficult to replace the light-guiding member when the light-guiding member needs to be replaced due to scratches, cracking or the like.

Furthermore, while the reflecting member is configured to guide light from the light-emitting element to the light-guiding member, no consideration is given to light from the light emitting face of the light-guiding member to the illumination target, and thus light irradiated onto the illumination target from the light emitting face of the light-guiding member tends to be scattered, thereby inviting loss of irradiation light from the light emitting face to the illumination target. Particularly, the amount of light produced by light sources formed of light-emitting elements such as LEDs tends be smaller than that by bar-shaped light sources such as a halogen lamp, and therefore it is desirable to increase the amount of light irradiated onto the illumination target described above.

In view of the above, the present invention aims at providing an illuminating device, an image reading apparatus and an image forming apparatus, in which the light-guiding member can be easily replaced with respect to the holding member, and the amount of irradiation light from light emitting face of the light-guiding member onto the illumination target can be increased.

Means for Solving the Problems

In order to address the above-described issues, the present invention provides an illuminating device including: a light source portion, a translucent elongated light-guiding member for illuminating an illumination target from an elongated light emitting face that extends in a longitudinal direction, by guiding light from the light source portion, and a holding member for holding the light-guiding member, wherein the holding member includes a holding portion for removably holding the light-guiding member and a tilted portion that reflects light from the light source portion that passes through the light-guiding member and that is emitted from the light emitting face, the tilted portion extending from a front end on the light emitting face side of the holding portion, obliquely widening with increasing distance from the light-guiding member.

Also, the present invention provides an image reading apparatus including an illuminating device of the present invention.

Also, the present invention provides an image forming apparatus including an image reading apparatus of the present invention.

With the present invention, the holding portion of the holding member removably holds the light-guiding member, and therefore when the light-guiding member needs to be replaced, the light-guiding member can be easily replaced with respect to the holding member. In addition, the tilted portion of the holding member extends from the front end on the light emitting face side of the holding portion so as to obliquely widen as the distance from the light-guiding member increases. Therefore, the light-guiding member can be smoothly attached to the holding portion along the tilted portion. Also, the tilted portion of the holding member reflects light emitted by the light source portion and emitted from the light emitting face via the light-guiding member, and therefore light from the light emitting face can be can be effectively condensed on the illumination target. In this manner, the amount of irradiation light onto the illumination target from the light emitting face can be increased. This configuration of the tilted portion is effective particularly in the case where a light source portion made up of a light-emitting element such as LED is used as the light source portion. That is, by the configuration of the tilted portion, the amount of irradiation light onto the illumination target from the light emitting face can be effectively increased with respect to light from a light source portion made up of a light-emitting element such as LED, whose light amount tends to be smaller than that of a bar-shaped light source portion such as halogen lamp.

In the present invention, a holding face of the holding portion for holding the light-guiding member preferably serves as a reflecting face for reflecting light inside the light-guiding member.

With this specific feature, light loss by reflection inside the light-guiding member can be suppressed by the holding face of the holding portion serving as the reflecting face, and the amount of irradiation light onto the illumination target from the light emitting face can be increased by that amount of suppressed light loss.

The holding portion and the tilted portion may be formed by a metal material such as stainless steel (SUS), for example.

In the present invention, a reflecting member is preferably provided at the holding face of the holding portion for holding the light-guiding member and at an inner face of the tilted portion.

With this specific feature, light loss by reflection inside the light-guiding member can be suppressed due to the reflecting member provided in the holding face of the holding portion. In addition, light loss by reflection in light emitted from the light emitting face can be suppressed by the reflecting member provided in the inner face of the tilted portion, and the amount of irradiation light onto the illumination target from the light emitting face can be increased by that amount of suppressed light loss. The reflecting member can be formed by a reflection film, for example.

In the present invention, the holding portion preferably holds the light-guiding member in a state of close contact.

With this specific feature, as a result of the holding portion holding the light-guiding member in close contact thereto, light leak in the light-guiding member can be suppressed. Accordingly, light loss by reflection inside the light-guiding member can be suppressed.

In another example of the present invention, the light source portion is provided on both sides in the longitudinal direction of the light-guiding member, and the light-guiding member irradiates the illumination target with light from the light emitting face by guiding light from the light source portion on one side from one end face in the longitudinal direction, and guiding light from the other light source portion on the other side from the other end face in the longitudinal direction.

Specific examples of the above mode will be described below, namely, (a) a mode in which the holding portion is formed in a quadrangular shape with one open side when viewed from the side in the longitudinal direction, and removably holds the light-guiding member fitted to an inner face of the holding portion, a length in a width direction at the open end of the holding portion having the quadrangular shape with one open side when viewed from the side in the longitudinal direction is shorter than a length in the width direction at a base end of the holding portion;

(b) a mode in which the holding portion is formed in a quadrangular shape with one open side when viewed from the side in the longitudinal direction, and removably holds the light-guiding member fitted to the inner face of the holding portion, the light-guiding member is formed in a square or a rectangular shape when viewed from the side in the longitudinal direction, and the length in the width direction at the open end of the holding portion having the quadrangular shape with one open side when viewed from the side in the longitudinal direction is shorter than a length in a width direction of the light-guiding member; and (c) a mode in which the foregoing modes (a) and (b) are combined.

With the above modes (a) to (c), it is possible to reliably hold the light-guiding member on the open side of the quadrangular holding portion with one open side when viewed from the side in the longitudinal direction. Accordingly, the light-guiding member and the holding portion can be in closer contact to each other, and the light leak in the light-guiding member can be suppressed correspondingly. As a result, light loss inside the light-guiding member can be further suppressed.

In the present invention, the holding portion is preferably formed of a metal material having elasticity.

With this specific feature, the light-guiding member and the holding portion can be in closer contact to each other, and in addition, the holding portion elastically deforms when holding the light-guiding member. Therefore, even though the light-guiding member is repeatedly replaced, the light-guiding member can be stably held for a long period of time.

Effects of the Invention

As described above, with an illuminating device, an image reading apparatus and an image forming apparatus of the present invention, as a result of the holding portion of the holding member removably holding the light-guiding member, when the light-guiding member needs to be replaced, the light-guiding member can be easily replaced with respect to the holding member. Furthermore, since the tilted portion of the holding member reflects light emitted by the light source portion and emitted from the light emitting face via the light-guiding member, and extends from the front end on the light emitting face side of the holding portion so as obliquely widen as the distance from the light-guiding member increases, the light-guiding member can be smoothly attached to the holding portion along the tilted portion. In addition, light from the emitting face can be effectively condensed on the illumination target, thereby increasing the amount of irradiation light onto the illumination target from the light emitting face.

BRIEF DESCRIPTION OF DRAWINGS

FIG. 6(a) is a front view of the light source substrate and FIG. 6(b) is a side view of the light source substrate.

FIGS. 7(a) and 7(b) are schematic side views of a main part of the light source unit as viewed from both sides in a longitudinal direction thereof. FIG. 7(a) is a diagram from one side, and FIG. 7(b) is a diagram from the other side.

FIG. 8(a) shows a reflection state of light that is irradiated on a document from the light emitting face by guiding light from two first light source portions whose emission faces oppose each other from both end faces in the longitudinal direction. FIG. 8(b) shows a reflection state of light that is irradiated on a document from the light emitting face by guiding light from two second light source portions whose emission faces oppose each other from both end faces in the longitudinal direction.

FIG. 10(a) is a schematic cross-sectional view of the first and second holding members and the first and second light-guiding members from one side in the longitudinal direction, FIG. 10(b) is a schematic side view of the first and second light-guiding members as viewed in the longitudinal direction, and FIG. 10(c) is a schematic side view of the first and second holding members as viewed in the longitudinal direction.

BEST MODE FOR CARRYING OUT THE INVENTION

An embodiment of the present invention will be described below with reference to the drawings. Note that the following embodiment is an example of embodying the invention, and does not limit the technical scope of the invention.

Figure 1:
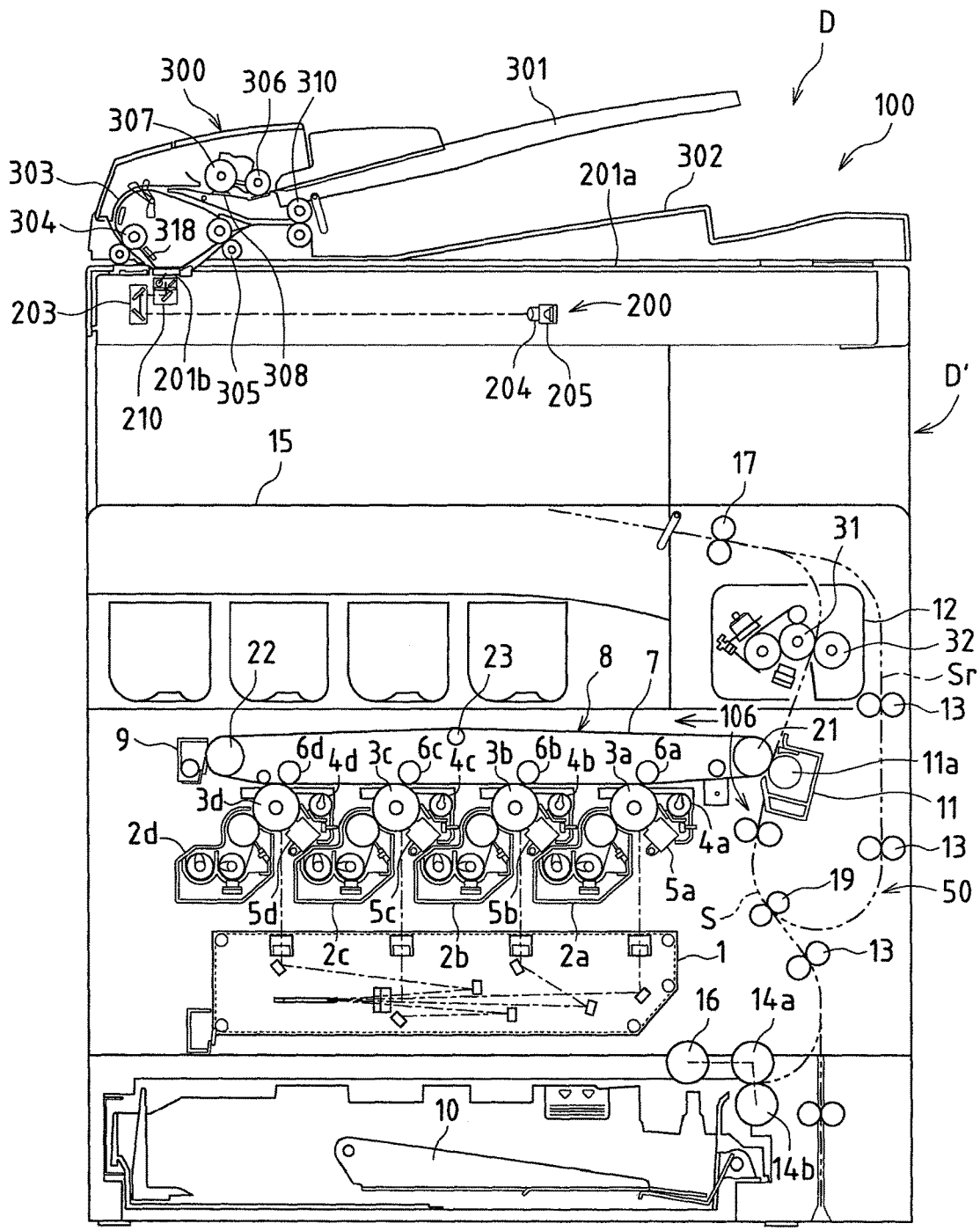
FIG. 1 is a side view schematically illustrating an image forming apparatus provided with an image reading apparatus to which an illuminating device according to an embodiment of the present invention is applied.

FIG. 1 is a side view schematically showing an image forming apparatus D provided with an image reading apparatus 100 to which an illuminating device according to an embodiment of the present embodiment is applied.

The image forming apparatus D shown in FIG. 1 is provided with the image reading apparatus 100 that reads an image of a document G (see FIG. 2 to be described later) as an illumination target and an apparatus main body D1 that records and forms the image on the document G read by the image reading apparatus 100 or images received from an outside source in color or in monochrome on a recording sheet such as plain paper.

Overall Configuration of Image Forming Apparatus

The apparatus main body D1 of the image forming apparatus D includes an exposure device 1, developing devices 2 (2a, 2b, 2c and 2d), photosensitive drums 3 (3a, 3b, 3c and 3d) that function as image carriers, charging devices 5 (5a, 5b, 5c and 5d), cleaning devices 4 (4a, 4b, 4c and 4d), an intermediate transfer belt device 8 that includes intermediate transfer rollers 6 (6a, 6b, 6c and 6d) that functions as transfer portion, a fixing device 12, a sheet transport device 50, a paper feed tray 10 that functions as a paper feed portion, and a paper discharge tray 15 that functions as a paper discharge portion.

Image data handled in the apparatus main body D1 of the image forming apparatus D corresponds to a color image using the colors black (K), cyan (C), magenta (M), and yellow (Y), or corresponds to a monochrome image using a single color (e.g., black). Accordingly, four each of the development apparatuses 2 (2a, 2b, 2c and 2d), the photosensitive drums 3 (3a, 3b, 3c and 3d), the charging devices 5 (5a, 5b, 5c and 5d), the cleaner apparatuses 4 (4a, 4b, 4c and 4d), and the intermediate transfer rollers 6 (6a, 6b, 6c and 6d) are provided so as to form four images corresponding to the respective colors, thus forming four image stations. The suffix letters a to d respectively correspond to black, cyan, magenta, and yellow. In the description below, the suffix letters a to d are omitted.

The photosensitive drums 3 are arranged substantially in the center of the apparatus main body D1 with respect to the vertical direction.

The charging devices 5 are charging means for evenly charging the surface of the photosensitive drums 3 to a predetermined potential, and may be of the roller type or of the brush type, which are contact types, but may also be of the charger type.

The exposure device 1 is a laser scanning unit (LSU) including a laser diode and a reflecting mirror, and exposes the surface of the charged photosensitive drums 3 to light according to image data, thereby forming on the surface an electrostatic latent image according to the image data.

The developing devices 2 develop an electrostatic latent image formed on the photosensitive drums 3 with four colors (K, C, M and Y) of toners. The cleaning devices 4 remove and collect toner remaining on the surface of the photosensitive drums 3 after developing and transferring an image.

The intermediate transfer belt device 8 arranged above the photosensitive drums 3 includes, other than the intermediate transfer rollers 6, an intermediate transfer belt 7, an intermediate transfer belt drive roller 21, an idler roller 22, a tension roller 23 and an intermediate transfer belt cleaning device 9.

Roller members such as the intermediate transfer belt drive roller 21, the intermediate transfer rollers 6, the idler roller 22, the tension roller 23 or the like support the intermediate transfer belt 7 in a stretched and tensioned manner, and rotate the intermediate transfer belt 7 around in a prescribed sheet transport direction (direction of the arrow in the drawing).

The intermediate transfer rollers 6 are rotatably supported inside the intermediate transfer belt 7, and pressed against the photosensitive drums 3 via the intermediate transfer belt 7.

The intermediate transfer belt 7 is provided contacting the respective photosensitive drums 3, and the toner images on the surfaces of the respective photosensitive drums 3 are sequentially transferred and superposed on the intermediate transfer belt 7, forming a color toner image (a toner image containing the respective colors). Here, the transfer belt 7 is formed as an endless belt using a film having a thickness of 100 μm to 150 μm, approximately.

The toner images are transferred from the photosensitive drums 3 to the intermediate transfer belt 7 using the intermediate transfer rollers 6 pressed against the inner side (back face) of the intermediate transfer belt 7. A high-voltage transfer bias (for example, a high voltage of the opposite polarity (+) to the charge polarity (−) of the toner) is applied to the intermediate transfer rollers 6 for transferring the toner images. The intermediate transfer rollers 6 are rollers including a base that is made of a metal (e.g., stainless steel) shaft having a diameter of 8 to 10 mm, the surface of the shaft being covered by an electrically conductive elastic material (e.g., EPDM, urethane foam, etc.). The electrically conductive elastic material enables a high voltage to be evenly applied to a recording sheet.

The apparatus main body D1 of the image forming apparatus D further includes a secondary transfer device 11 that includes a transfer roller 11a functioning as a transfer portion. The transfer roller 11a contacts the outer side of the intermediate transfer belt 7.

As described above, toner images on the surfaces of the respective photosensitive drums 3 are superposed on the intermediate transfer belt 7, forming a toner image of colors represented by the image data. The toner images of the respective colors superposed in this manner are transported with the intermediate transfer belt 7, and are transferred on a recording sheet by the secondary transfer device 11.

The intermediate transfer belt 7 and the transfer roller 11a of the secondary transfer device 11 are pressed to each other to form a nip region. A voltage is applied to the transfer roller 11a of the secondary transfer device 11 (for example, a high voltage of the opposite polarity (+) to the charge polarity (−) of the toner) in order to transfer the toner images of the respective colors on the intermediate transfer belt 7 to the recording sheet. Furthermore, in order to constantly maintain the nip region, one of the transfer rollers 11a of the secondary transfer apparatus 11 and the intermediate transfer belt-driving roller 21 is made of a hard material (metal, etc.), and the other is made of a soft material such as an elastic roller (elastic rubber roller, foamable resin roller, etc.).

The toner image on the intermediate transfer belt 7 may not be completely transferred by the secondary transfer apparatus 11 to the recording sheet, and toner may remain on the intermediate transfer belt 7.

This residual toner causes toner color mixing in the following step. Accordingly, residual toner is removed and collected by the intermediate transfer belt cleaning device 9. The intermediate transfer belt cleaning device 9 includes, for example, a cleaning blade that is in contact with the intermediate transfer belt 7 as a cleaning member, and residual toner can be removed and collected by the cleaning blade. The idler roller 22 supports the intermediate transfer belt 7 from the inner side (back face), and the cleaning blade is in contact with the intermediate transfer belt 7 to press from outside against the idler roller 22.

The paper feed tray 10 is a tray in which recording sheets are stored, and is disposed below the image forming portion of the apparatus main body D1. The paper discharge tray 15 disposed above the image forming portion is a tray on which printed recording sheets are placed facedown.

In addition, in the apparatus main body D1 is provided the sheet transport device 50 for feeding the recording sheet in the paper feed tray 10 to the paper discharge tray 15 via the secondary transfer device 11 and the fixing device 12. The sheet transport device 50 includes an S-shaped sheet transport path S, and transport members such as a pickup roller 16, an isolating roller 14a, a separation roller 14b, transport rollers 13, a pre-registration roller pair 19, a registration roller pair 106, the fixing device 12 and discharge rollers 17 are arranged along the sheet transport path S.

The pickup roller 16 is a draw-in roller that is disposed in a downstream side end portion in the sheet transport direction of the paper feed tray 10 and that feeds recording sheets sheet by sheet from the paper feed tray 10 into the paper transport path S. The isolating roller 14a allows recording sheets to pass between the isolating roller 14a and the separation roller 14b to separate the sheets into individual sheets and transports the separated sheets to the sheet transport path S. The transport rollers 13 and the pre-registration roller pair 19 are small rollers for facilitating and assisting transportation of the recording sheets. The transport rollers 13 are disposed in plural locations in the sheet transport path S. The pre-registration roller pair 19 is disposed in a position right before the registration roller pair 106 on the upstream side in the sheet transport direction, and transports the recording sheet to the registration roller pair 106.

The fixing device 12 receives a recording sheet onto which a toner image has been transferred, and transports the recording sheet while sandwiching the recording sheet between a heating roller 31 and a pressure roller 32.

The temperature of the heating roller 31 is controlled to a prescribed fixing temperature, and performs thermal pressing on the recording sheet with the pressure roller 32 to melt, mix and press the toner images transferred on the recording sheet, thereby thermally fixing the toner images on the recording sheet.

After the toner images of the respective colors are fixed, the recording sheet is discharged to the paper discharge tray 15 by the discharge rollers 17.

Note that it is possible to form a monochrome image by using only one of the four image forming stations, and transfer the monochrome image to the intermediate transfer belt 7 of the intermediate transfer belt device 8. The monochrome image is also transferred to the recording sheet from the intermediate transfer belt 7, similarly to the color image, and fixed on the recording sheet.

Also, in the case where an image is formed not only on the front face of the recording sheet, but on both faces, after the image on the front face of the recording sheet is fixed by the fixing device 12, the discharge rollers 17 are stopped while the recording sheet is transported by the discharge rollers 17 in the sheet transport path S, and then discharge rollers 17 are rotated in reverse to allow the recording sheet to pass a front-back reverse route Sr. The front and back faces of the recording sheet are then inverted, and the recording sheet is again guided to the registration roller pair 106. Then, an image is recorded and fixed on the back face of the recording sheet similarly to the front face of the recording sheet, and the recording sheet is discharged to the paper discharge tray 15.

Overall Configuration of Image Reading Apparatus

Figure 2:
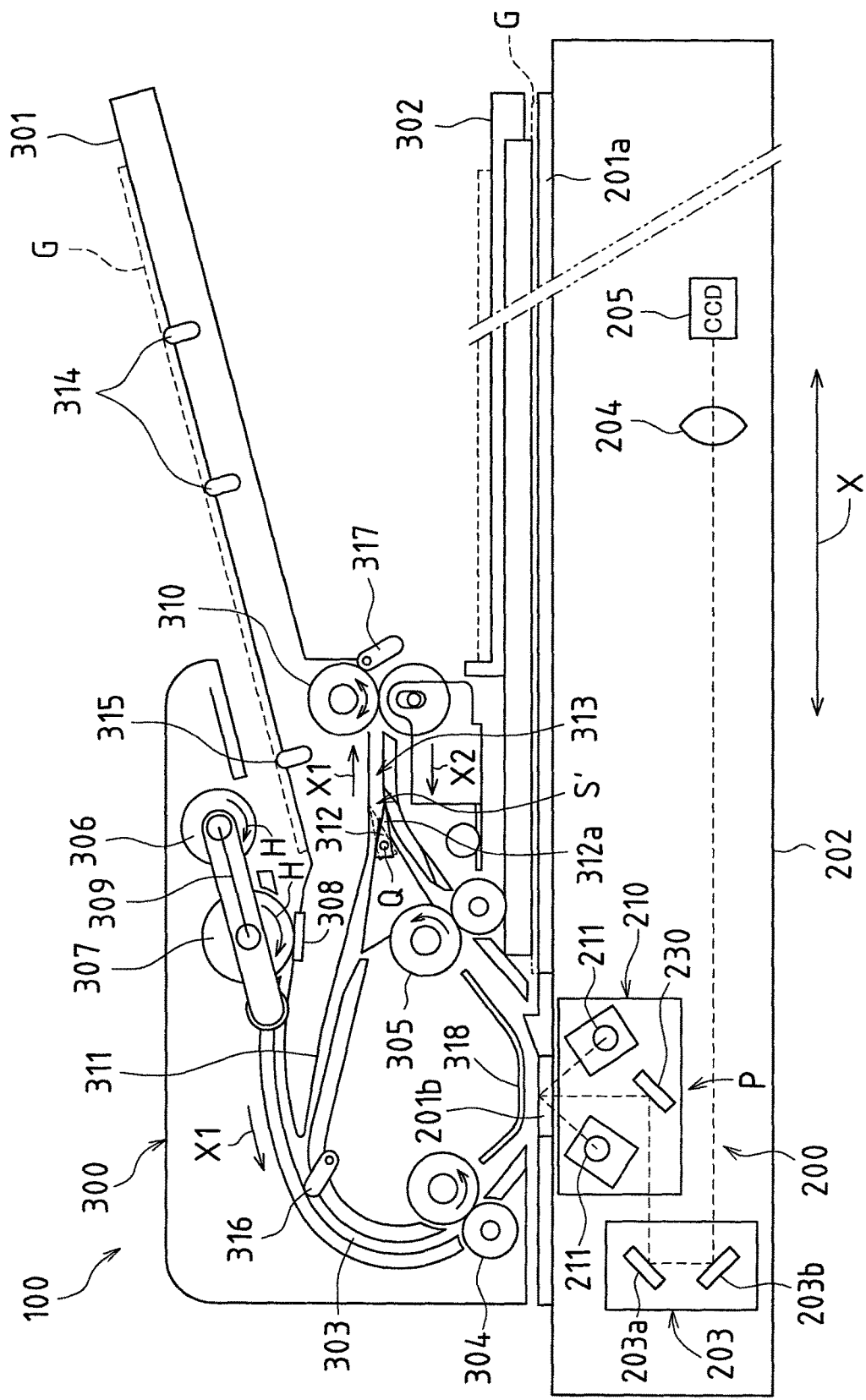
FIG. 2 is a schematic cross-sectional view of the image reading apparatus shown in FIG. 1.
Figure 3:
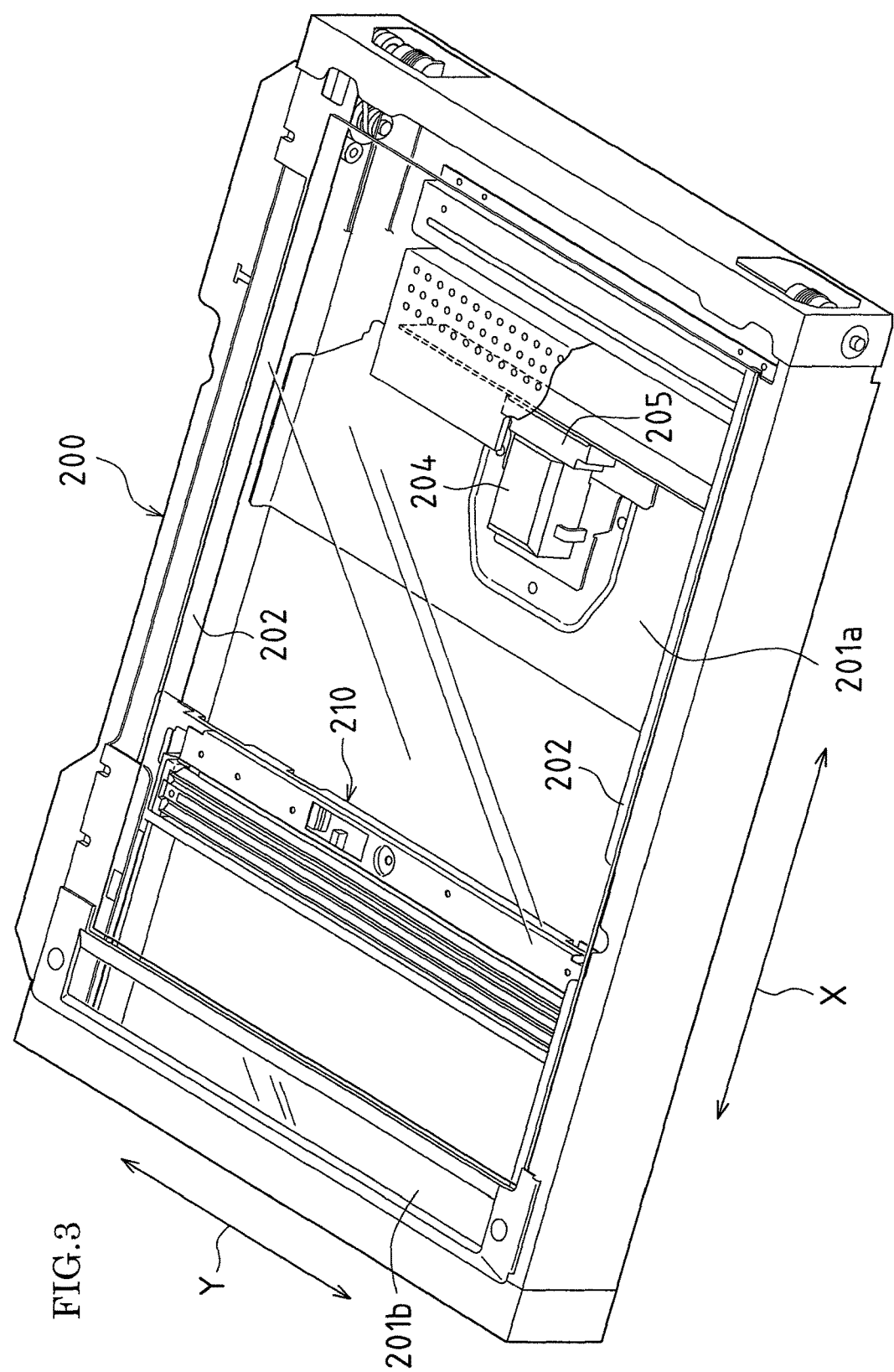
FIG. 3 is a schematic perspective view of the image reading apparatus shown in FIG. 1.

FIG. 2 is a schematic cross-sectional view of the image reading apparatus 100 shown in FIG. 1. FIG. 3 is a schematic perspective view of the image reading apparatus 100 shown in FIG. 1.

The image reading apparatus 100 shown in FIGS. 1 to 3 is provided with a configuration to read a document image while keeping the document G fixed in a stationary document reading arrangement, and a configuration to read a document image while moving the document G in a moving document reading arrangement.

That is, the image reading apparatus 100 has a stationary document reading configuration in which document G placed on a platen glass 201a is illuminated by a light source portion 211 via the platen glass 201a, and the document image is read by scanning light reflected from the document G that is illuminated by the light source portion 211 in a main scanning direction (direction of the arrow Y in the drawing) while the light source portion 211 is moved in a sub-scanning direction (direction of the arrow X in the drawing), and a moving document reading configuration in which while illuminating the document G transported by an automatic document feeder 300 in the sub-scanning direction X so as to pass over a document reading glass 201b by the light source portion 211 positioned at a home position P in a document reading portion 200 via the glass 201b, reflected light from the document G illuminated by the light source portion 211 is scanned in the main scanning direction Y, thereby reading the document image. Note that FIG. 2 shows a state in which the light source portion 211 is in the home position P. Also, in FIG. 3, the automatic document feeder 300, a mirror unit 203 described below or the like are not shown.

Specifically, the document reading portion 200 includes the platen glass 201a, a light source unit 210 including the light source portion 211 (example of the illuminating device), an optical system driving portion that moves the light source portion 211 (not shown), the mirror unit 203, a condensing lens 204 and an imaging element (here, CCD) 205. Also, the light source portion 211 is disposed in the light source unit 210. These are accommodated in a metal frame (hereinafter referred to as a "frame body") 202. Note that the light source unit 210 will be described in detail later.

The platen glass 201a is made of a transparent glass plate, and both end portions thereof in the main scanning direction Y are placed on the frame body 202. Note that the automatic document feeder 300 is capable of opening and closing with respect to the document reading portion 200 about an axis line along the sub-scanning direction X (pivotably supported by a hinge, for example), and its bottom face also functions as a document pressing member for pressing the document G placed on the platen glass 201a of the document reading portion 200 from above.

The mirror unit 203 includes a second mirror 203a, a third mirror 203b and a supporting member (not shown). The supporting member supports the second mirror 203a so as to reflect light from the first mirror 230 in the light source unit 210 to be guided to the third mirror 203b, and also supports the third mirror 203b so as to reflect light from the second mirror 203a to be guided to the condensing lens 204. The condensing lens 204 condenses light from the third mirror 203b to the imaging element 205. The imaging element 205 converts light from the condensing lens 204 (document image light) to electric signals as image data.

In addition, the optical system driving portion is configured to move the light source unit 210 at a constant speed in the sub-scanning direction X, and at the same time, move the mirror unit 203 at a moving speed that is half the moving speed of the light source unit 210 also in the sub-scanning direction X.

Here, the document reading portion 200 supports not only the stationary document reading arrangement, but also the moving document reading arrangement as well, and thus includes the document reading glass 201b. Accordingly, the optical system driving portion is further configured to position the light source unit 210 in a prescribed home position P below the document reading glass 201b. Note that although the platen glass 201a and the document reading glass 201b are independent elements in this embodiment, they may be formed as one element.

The automatic document feeder 300 includes a document tray 301 on which the document G is placed for transportation, a discharge tray 302 arranged below the document tray 301, a first transport path 303 that connects the document tray 301 and the discharge tray 302, and two transport roller pairs including an upstream side transport roller pair 304 and a downstream side transport roller pair 305 that transport the document G on the upstream side and downstream side, respectively, in a transport direction X1 of the document G, with respect to the document reading glass 201b. Specifically, the upstream side transport roller pair 304, the document reading glass 201b and the downstream side transport roller pair 305 are arranged in this order in the transport direction X1. Also, the document reading glass 201b is disposed substantially horizontally so as to form the transport wall of the first transport path 303.

The automatic document feeder 300 further includes a pickup roller 306, an isolating roller 307 and a separation member 308 such as a separation pad.

The pickup roller 306 feeds forward the document G placed on the document tray 301 from the document tray 301 to the first transport path 303 in the transport direction X1. The isolating roller 307 is arranged on the downstream side in the transport direction X1 relative to the pickup roller 306, and sandwiches the document G sent by the pickup roller 306 with the separation member 308, and further transports the document G to the downstream side in the transport direction X1. The separation member 308 is opposed to the isolating roller 307 and singularizes (separates) the documents G transported therebetween into individual sheets.

The automatic document feeder 300 configured as described above transports the documents G up to between the isolating roller 307 and the separation member 308 by the pickup roller 306, where the documents G are singularized and separated and are at the same time transported sheet by sheet as a result of the isolating roller 307 being driven to rotate. Then, the document G transported by the isolating roller 307 is guided by the first transport path 303, thereby making it possible to feed the document G sheet by sheet toward the upstream side transport roller pair 304.

Specifically, the pickup roller 306 can contact and be separated from the document G placed on the document tray 301 with the use of a pickup roller drive portion not shown in the drawings. In addition, the pickup roller 306 is connected to the isolating roller 307 via a drive transmission means 309 including an endless belt or the like so as to rotate in the same direction as the isolating roller 307. When there is a request to read the document G, the pickup roller 306 and the isolating roller 307 are driven by a document feed drive portion not shown in the drawings to rotate in a direction with which the document G is transported in the transport direction X1 (the arrow H in FIG. 2).

In the present embodiment, the automatic document feeder 300 is also configured such that, after transporting the document G so as to enable reading one face thereof, the document G can be inverted so as to reverse the front and back faces thereof, thereby transporting the document G so as to enable reading the other face thereof.

Specifically, in addition to the above-described configuration, the automatic document feeder 300 further includes a reverse roller pair 310, a second transport path 311 and a switching claw 312.

The first transport path 303 is formed as a loop to transport the document G from the isolating roller 307 to the discharge tray 302, via the upstream side transport roller pair 304, document reading glass 201b, downstream side transport roller pair 305 and reverse roller pair 310. The reverse roller pair 310 is disposed on the downstream side in the transport direction X1 relative to the downstream side transport roller pair 305, and transports the document G transported from the downstream side transport roller pair 305 such that the trailing end of the document G (the upstream side end in the transport direction X1) is in the front. The second transport path 311 is branched at a branch portion S1 between the reverse roller pair 310 and the downstream side transport roller pair 305, and guides the document G transported such that the trailing end thereof is in the front to the further upstream side in the transport direction X1 than the upstream side transport roller pair 304 of the first transport path 303, in order to invert the front and back faces of the document G. A switchback transport path 313 is formed between the reverse roller pair 310 and the branch portion S1 of the first transport path 303. The switchback transport path 313 is capable of transportation of the document G by forward rotation of the reverse roller pair 310 (the transport direction X1 of the document G) and reverse transportation of the document G by reverse rotation of the reverse roller pair 310.

The switching claw 312 is arranged in the branch portion S1, and is configured to be capable of taking a first switching posture in which the document G is guided to the upstream side transport roller pair 304 from the reverse roller pair 310 via the second transport path 311, and a second switching posture in which the document G is guided to the reverse roller pair 310 from the downstream side transport roller pair 305 via the switchback transport path 313.

Here, in a normal state, the switching claw 312 is arranged directly connecting the switchback transport path 313 and the second transport path 311 (first switching posture, see the solid line in FIG. 2). When the document G whose document image has been read by the document reading portion 200 is transported in the transport direction X1, the leading end of the document G (the downstream side end in the transport direction X1) pushes up the switching claw 312 to guide the document G to the switchback transport path 313 (second switching posture, see the dashed line in FIG. 2). The branching claw 312 is capable of freely swaying about a swaying axis Q along the axis line direction of the reverse roller pair 311 such that a claw portion 312a drops due to its own weight, thereby blocking the first transport path 303 between the downstream side transport roller pair 305 and the reverse roller pair 310 to take the first switching posture. When the trailing end of the document G is positioned in the switchback transport path 313, and the document G is transported in reverse in a reverse-transport direction (direction of the arrow X2 in FIG. 2) that is the opposite direction to the transport direction X1 of the document G by the reverse roller pair 310 rotating in the reverse direction, the switching claw 312 guides the document G to the second transport path 311.

Note that the size of the document G placed on the document tray 301 is detected by a document size sensor 314 disposed in a document placement portion of the document tray 301. Whether a document G is placed on the document tray 301 or not is detected by a document detecting sensor 315 disposed near the pickup roller 306 of the document placement portion of the document tray 301. Also, in a stopped state, the upstream side transport roller pair 304 causes the leading end of the document G transported by the isolating roller 307 to abut against the same for alignment, and is driven to rotate in accordance with the timing for reading. The document G thus transported is detected by a transport sensor 316 that is disposed on the further downstream side than the second transport path 311 and also on the further downstream side than the upstream side transport roller pair 304, in the transport direction X1 of the first transport path 303. The document G discharged by the reverse roller pair 310 is detected by a discharge sensor 317 disposed near the reverse roller pair 310 on the discharge side relative to the reverse roller pair 310. Note that the transport roller pairs 304 and 305, reverse roller pair 310 or the like are driven by a transport system drive portion, which is not shown.

Also, in the present embodiment, the automatic document feeder 300 further includes a reading guide 318 that faces the document reading glass 201b with the document G interposed therebetween.

In the image reading apparatus 100 described above, when an instruction to read the document image of the document G by the stationary document reading arrangement is made, the light source unit 210 moves to one side in the sub-scanning direction X at a constant speed while irradiating the document G placed on the platen glass 201a with light via the platen glass 201a, thereby scanning the image of the document G. At the same time, the mirror unit 203 also moves to the one side in the sub-scanning direction X at a moving speed that is half the moving speed of the light source unit 210.

Reflected light from the document G illuminated by the light source unit 210 is reflected by the first mirror 230 provided in the light source unit 210 and then the optical path of which is converted by 180° by the second and third mirrors 203a and 203b of the mirror unit 203. Light reflected by the third mirror 203b forms an image on the imaging element 205 via the condensing lens 204, and here the document image light is read to be converted to electric image data.

When an instruction to read the document image on the document G by the moving document reading system is made, automatic document feeder 300 transports the document G to one side in the sub-scanning direction X so as to pass a portion above the position indicated in FIG. 2, while the light source unit 210 and the mirror unit 203 staying in the position indicated in FIG. 2. That is, the documents G placed on the document tray 301 are taken out by the pickup roller 306, separated by the isolating roller 307 and the separation member 308 into individual sheets, and transported to the first transport path 303. After transportation of the document G is confirmed by the transport sensor 316, the leading end of the document G transported to the first transport path 303 is aligned to prevent slanted transportation of the document G and sent out at a prescribed timing for reading by the upstream side transport roller pair 304, then the front and back faces are inverted and transported to the document reading glass 201b.

Onto one face of the document G that passes above the document reading glass 201b, light from the light source unit 210 is irradiated via the document reading glass 201b and reflected by the one face. The light reflected by the one face of the document G is reflected by the first mirror 230 similarly to the above-described stationary document reading arrangement, and thereafter the optical path of which is converted by 180° by the second and third mirrors 203a and 203b of the mirror unit 203. Light reflected from the third mirror 203b forms an image on the imaging element 205 via the condensing lens 204, and here the document image is read and converted to electric image data. Note that this reading operation by the imaging element 205 is the same in the case of duplex reading to be described later, and the operation will not be described below.

The document G that has been read is drawn off the reading glass 201 by the downstream side transport roller pair 305, and discharged onto the discharge tray 302 by the reverse roller pair 310, which is capable of forward and reverse rotation via the switchback transport path 313 of the first transport path 303.

Also, in the case where both of one face and the other face of the document G are read, the document G one face of which has been read is not discharged to the discharge tray 302, but transported such that the trailing end thereof is positioned in the switchback transport path 313. The document G is then transported in reverse in the reverse-transport direction X2 by the reverse roller pair 310 rotating in reverse, and guided to the second transport path 311 by the switching claw 312 in the first switching posture. The document G guided to the second transport path 311 is again returned to the first transport path 303 via the second transport path 311 and as a result, the document G is transported by the upstream side transport roller pair 304 with the front and back faces thereof inverted, passes above the document reading glass 201*b*, and thus the other face of which is read. The document G both faces of which have been read again returns to the first transport path 303 and is transported by the transport roller pairs 304 and 305 with the front and back faces thereof inverted. Thereafter, the document G passes the switchback transport path 313 of the first transport path 303, and is discharged to the discharge tray 302 via the reverse roller pair 310 rotating in the forward direction.

Description of Characteristic Portions of the Invention

A light source unit according to an embodiment of the invention may be configured to include one or two or more light-guiding members. Here, a light source unit 210 including two light-guiding members, namely first and second light-guiding members 213*a* and 213*b*, will be described below as an example.

Figure 4:
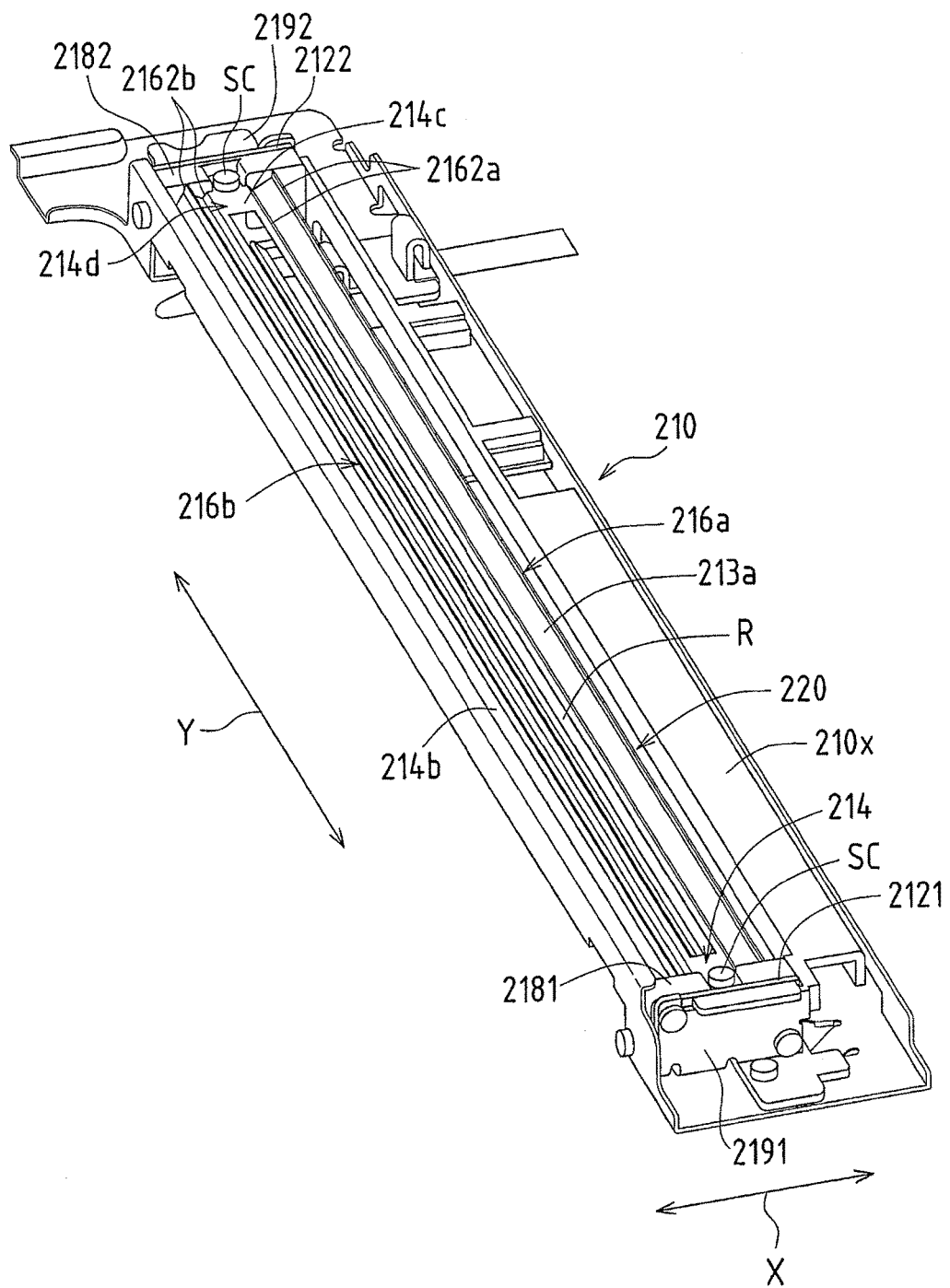
FIG. 4 is a schematic perspective view showing a general configuration of a light source unit according to the embodiment.
Figure 5:
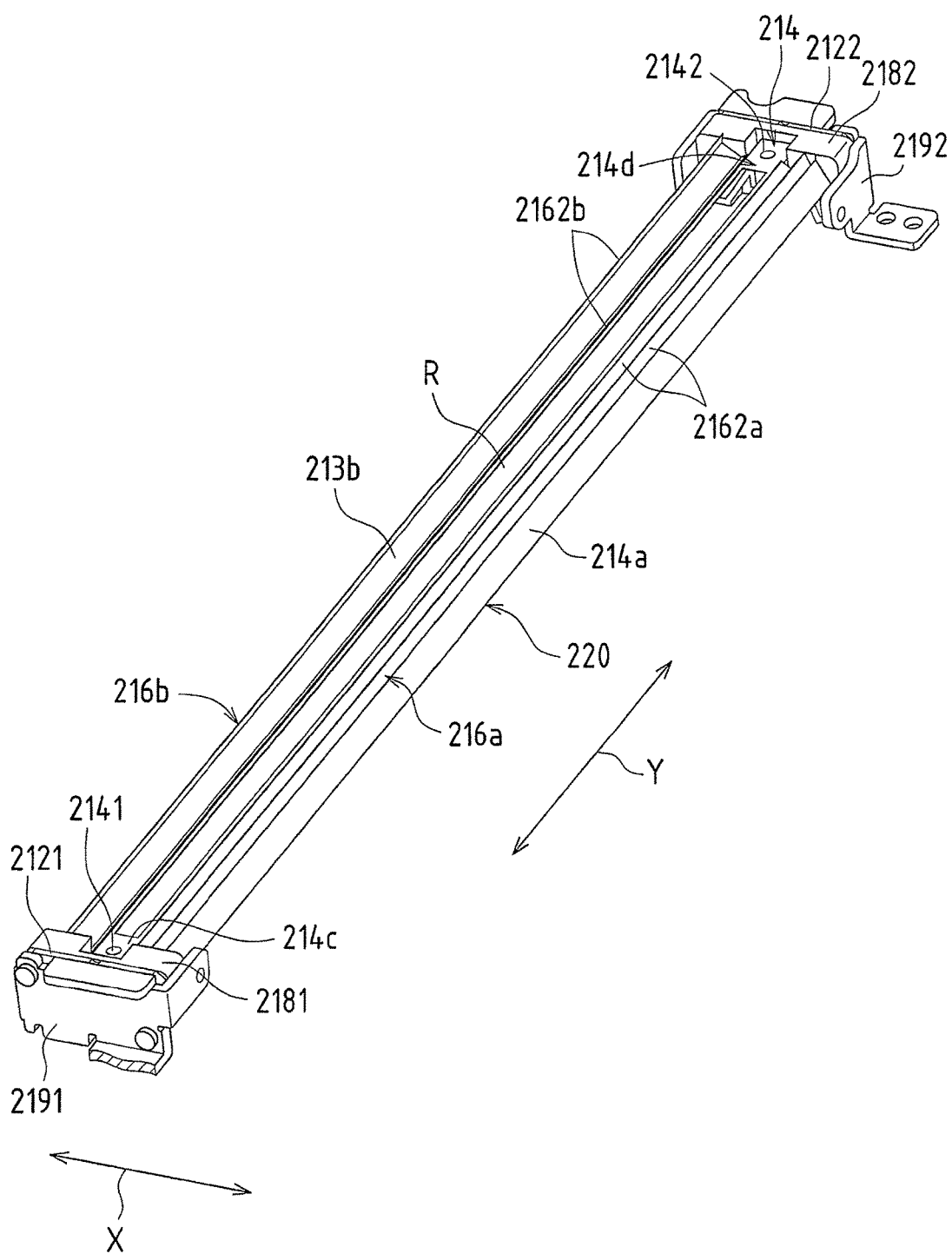
FIG. 5 is a schematic perspective view illustrating a light source light-guiding member unit of the light source unit.

FIG. 4 is a schematic perspective view showing a schematic configuration of the light source unit 210 according to the present embodiment. FIG. 5 is a schematic perspective view illustrating a light source light-guiding member unit 220 of the light source unit 210.

Figure 6A:
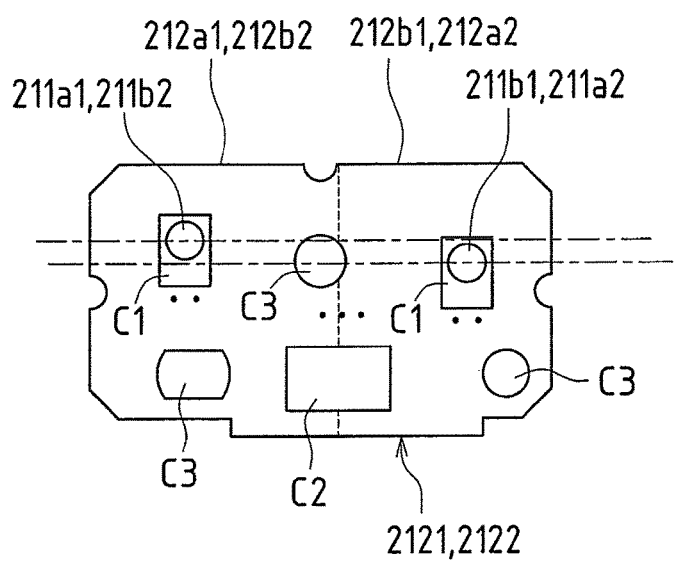
FIGS. 6(a) and 6(b) are schematic views of a light source substrate of the light source unit, where
Figure 6B:
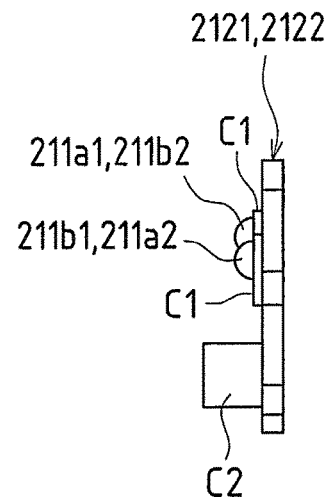

Also, FIG. 6 is a schematic view showing two light source substrates 2121 and 2122 of the light source unit 210. FIG. 6(*a*) shows a front view of the light source substrates 2121 and 2122, and FIG. 6(*b*) shows a side view of the light source substrates 2121 and 2122. Note that the two light source substrates 2121 and 2122 are members having the same configuration, which are shown by a single diagram in FIG. 6. Also, in FIG. 6, reference numeral C1 indicates the seatings of light source portions 211*a*1, 211*b*1, 211*a*2 and 211*b*2, reference numeral C2 indicates a connecter terminal, and reference numeral C3 indicates attachment screw holes of the light source substrates 2121 and 2122.

Also, FIG. 7 is a schematic side view of a main part of the light source unit 210 as viewed from both sides in the longitudinal direction. FIG. 7(*a*) is a diagram as viewed from one side, and FIG. 7(*b*) is a diagram as viewed from the other side. Note that in FIG. 7, the seating C1, the connector terminal C2 and the attachment screw hole C3 are not shown.

Figure 8A:
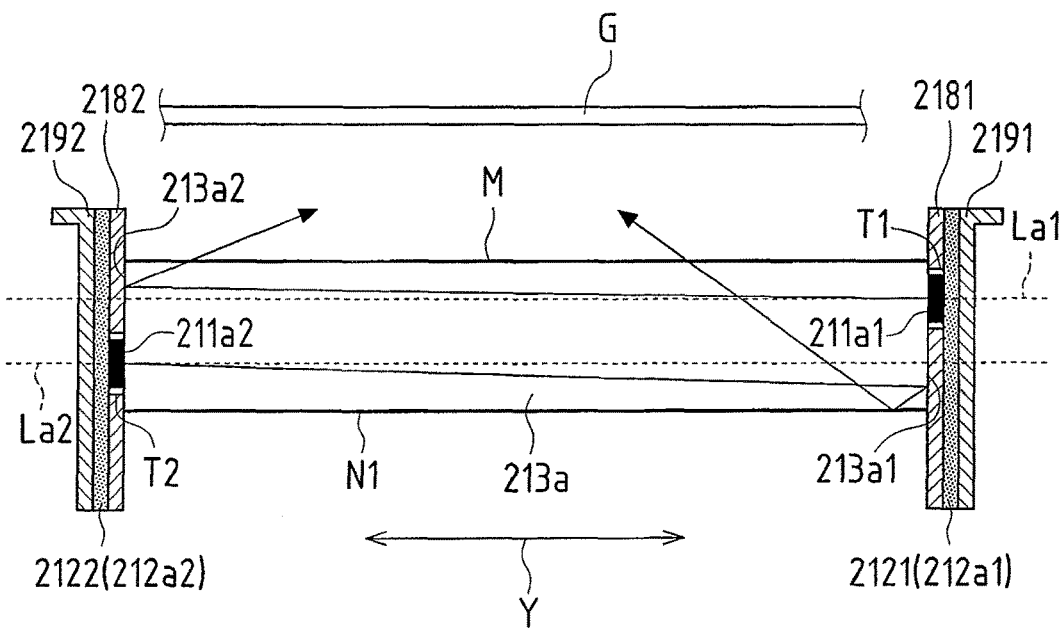
FIGS. 8(a) and 8(b) are schematic cross-sectional views illustrating light reflection states with first and second light-guiding members.
Figure 8B:
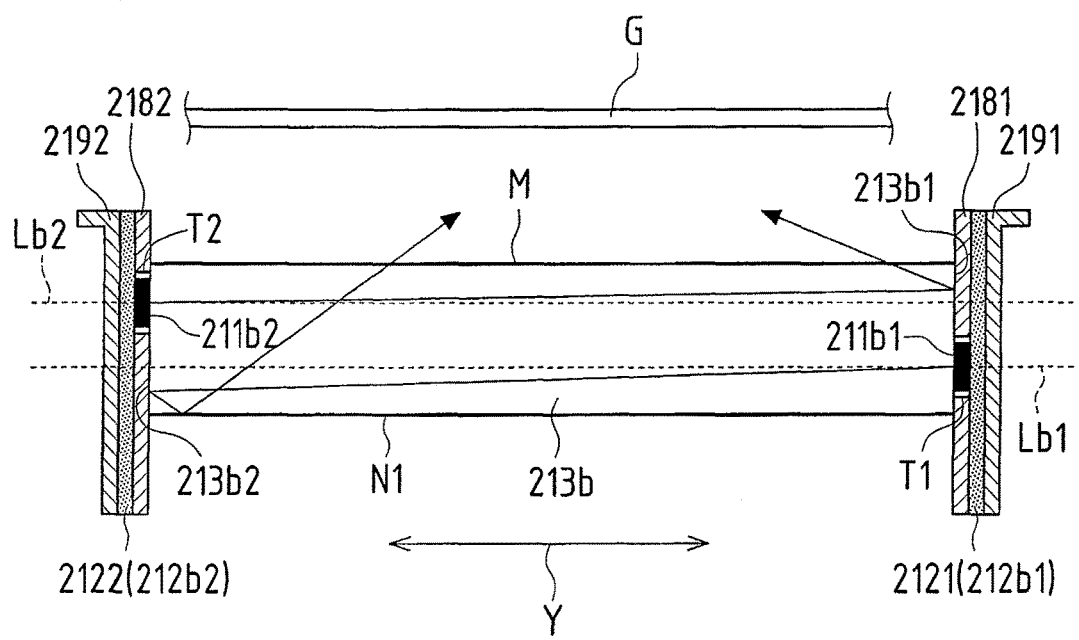

FIG. 8 is a schematic cross-sectional view illustrating light reflection states in the first and second light-guiding members 213*a* and 213*b*. FIG. 8(*a*) shows a reflection state of light that is irradiated on the document G from a light emitting face M by guiding light from the two first light source portions 211*a*1 and 211*a*2 whose emission faces oppose each other from both end faces 213*a*1 and 213*a*2 in the longitudinal direction Y. FIG. 8(*b*) shows a reflection state of light that is irradiated on the document G from the light emitting face M by guiding light from the two second light source portions 211*b*1 and 211*b*2 whose emission faces oppose each other from both end faces 213*b*1 and 213*b*2 in the longitudinal direction Y. Note that in FIG. 8, the glass provided between the document and the light source portion is not shown.

The light source unit 210 includes the two light source substrates 2121 and 2122, first and second light-guiding members 213*a* and 213*b*, a base body 214, and first and second reflecting members (here, reflection film) 215*a* and 215*b*.

In the present embodiment, one of the two light source substrates 2121 and 2122, the light source substrate 2121, is formed by forming a first light source substrate 212*a*1 on one side, and a second light source substrate 212*b*1 on one side in one piece (see FIG. 6). The first light source portion 211*a*1 on the one side, which emits light to the first light-guiding member 213*a*, is mounted to the first light source substrate 212*a*1 on the one side. The second light source portion 211*b*1 on the one side, which emits light to the second light-guiding member 213*b* is mounted to the second light source substrate 212*b*1 on the one side. Out of the two light source substrates 2121 and 2122, the light source substrate 2122 on the other side is formed by forming a first light source substrate 212*a*2 on the other side and a second light source substrate 212*b*2 on the other side in one piece (see FIG. 6). A first light source portion 211*a*2 on the other side, which emits light to the first light-guiding member 213*a* is mounted to the first light source substrate 212*a*2 on the other side. A second light source portion 211*b*2 on the other side, which emits light to the second light-guiding member 213*b* is mounted to the second light source substrate 212*b*2 on the other side. Note that the light source portions correspond to the element denoted by the reference numeral 211 in FIG. 2.

Specifically, the first and second light source portions 211*a*1 and 211*b*1 on the one side, and the first and second light source portions 211*a*2 and 211*b*2 on the other side are all LED light source portions made up of an LED light-emitting element.

The first and second light-guiding members 213*a* and 213*b* are each made of a translucent material, and have an elongated shape extending in the main scanning direction Y. The first and second light-guiding members 213*a* and 213*b* are disposed side by side in the sub-scanning direction X that extends along the light irradiation face of the document G at a prescribed interval such that their longitudinal directions Y match each other.

The first light-guiding member 213*a* guides light from the first light source portion 211*a*1 on the one side from one end face 213*a*1 in the longitudinal direction Y, and at the same time guides light from the first light source portion 211*a*2 on the other side from the other end face 213*a*2 in the longitudinal direction Y, thereby irradiating light on the document G from the light emitting face (top face) M extending in the longitudinal direction Y (see FIG. 8(*a*)). The second light-guiding member 213*b* guides light from the second light source portion 211*b*1 on the one side from the end face 213*b*1 on the one side in the longitudinal direction Y, and guides light from the second light source portion 211*b*2 on the other side from the end face 213*b*2 on the other side in the longitudinal direction Y, thereby irradiating light on the document G from the light emitting face (top face) M extending in the longitudinal direction Y (see FIG. 8(*b*)).

Specifically, the first and second light-guiding members 213*a* and 213*b* each have a rectangular parallelepiped shape. Here, the first and second light-guiding members 213*a* and 213*b* are each formed by acrylic resin. Also, faces of the first and second light-guiding members 213a and 213b positioned on the opposite side to the light emitting face M (i.e. bottom faces) are each indicated as a reflecting face N1. This reflecting face N1 is formed in a shape of minute triangles (e.g., a saw shape) when viewed from width directions Xa and Xb along the light emitting face M, which are perpendicular to the longitudinal direction Y. In addition, from the viewpoint of increasing the light amount toward the center in the longitudinal direction Y, the gap between the peaks in the reflecting face N1 provided with triangle shapes decreases toward the center in the longitudinal direction Y.

As shown in FIGS. 4, 5 and 7, the base body 214 includes one fixing portion 2141 (in this case, a screw hole for fixing with a screw SC) where the one light source substrate 2121 is fixed on the side of the end faces 213a1 and 213b1 on the one side in the longitudinal direction of the first and second light-guiding members 213a and 213b, and another fixing portion 2142 (in this case, a screw hole for fixing with a screw SC) where the other light source substrate 2122 is fixed on the side of the end faces 212a2 and 213b2 on the other side in the longitudinal direction of the first and second light-guiding members 213a and 213b. Thus, the first and second light source portions 211a1 and 211b1 on the one side and the first and second light source portions 211a2 and 211b2 on the other side are arranged in the end faces 213a1 and 213b1 on the one side in the longitudinal direction and the end faces 213a2 and 213b2 on the other side in the longitudinal direction, respectively, of the first and second light-guiding members 213a and 213b.

The base body 214 further includes a first support portion 214a for supporting the first light-guiding member 213a, a second support portion 214b for supporting the second light-guiding member 213b, and a joining portion 214c for connecting the first support portion 214a and the second support portion 214b. In the joining portion 214c provided between the first support portion 214a and the second support portion 214b is formed a slit R for allowing reflected light from the document G to pass, the slit R extending in the longitudinal direction Y. Note that here, the first support portion 214a, the second support portion 214b and the joining portion 214c are configured as a supporting plate 214d that is formed in one piece.

Specifically, the first and second support portions 214a and 214b are each formed to have a quadrangular shape, with one open side when viewed from the side in the longitudinal direction Y. That is, the first and second support portions 214a and 214b are each formed by a bottom plate extending in the longitudinal direction Y, and two side plates each extending perpendicularly or substantially perpendicularly toward the document G from both end portions of the bottom plate in the width directions Xa and Xb along the light emitting faces M that are perpendicular to the longitudinal direction Y. The first and second support portions 214a and 214b are disposed side by side in a direction X along the light irradiation face of the document G, the direction X being perpendicular to the longitudinal direction Y, at a prescribed interval such that the longitudinal directions Y of the first and second support portions 214a and 214b match each other. In addition, the second support portion 214b side of the open end of the quadrangular first support portion 214a with one open side when viewed from the side is connected to the first support portion 214a side of the open end of the quadrangular second support portion 214b with one open side when viewed from the side by the joining portion 214c. The one fixing portion 2141 is provided at one of the both end portions in the longitudinal direction Y of the joining portion 214c, and the other fixing portion 2142 is provided at the other end portion in the longitudinal direction Y. Note that the first and second light-guiding members 213a and 213b are arranged so as to cause light emitted from the light emitting faces M thereof to mutually intersect on the light irradiation face of the document G (in this case, so as to let the incident angles of the incident light beams entering the document G match each other, when viewed from the side in the longitudinal direction Y). Therefore, here, the first and second support portions 214a and 214b are arranged such that the distance therebetween increases from the open ends thereof toward the base ends opposite thereto when viewed from the side in the longitudinal direction Y.

The first reflecting member 215a mainly reflects light that passes through the first light-guiding member 213a with side faces N2 on both sides in the width direction Xa along the light emitting face M, which is perpendicular to the longitudinal direction Y of the light-guiding member 213a. In contrast, the second reflecting member 215b mainly reflects light that passes through the second light-guiding member 213b with side faces N2 on both sides in the width direction Xb of the light-guiding member 213b (see FIG. 7).

Specifically, the first reflecting member 215a is arranged on the faces other than the two end faces 213a1 and 213a2 of the first light-guiding member 213a and the light emitting face M. The second reflecting member 215b is arranged on the faces other than the two end faces 213b1 and 213b2 of the second light-guiding member 213b and the light emitting face M. The first and second reflecting members 215a and 215b are each formed by a reflection film having a high reflectance (for example, Vikuiti (registered trademark) DESR-M series (manufactured by 3M) having a high reflectance of 98% or more), and arranged at least, out of the reflecting face N1 and the two side faces N2 of the first and second light-guiding members 213a and 213b, on the two side faces N2.

In the present embodiment, the base body 214 further includes first and second holding members 216a and 216b for holding the first and second light-guiding members 213a and 213b, respectively.

Figure 9:
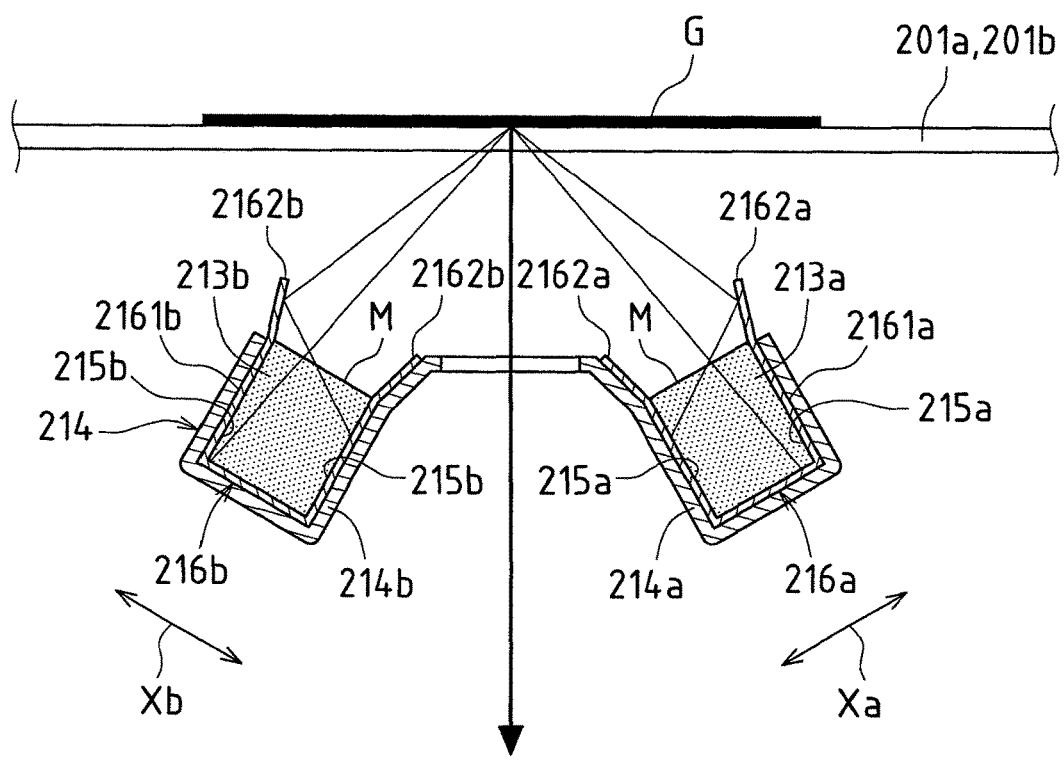
FIG. 9 is a schematic cross-sectional view showing an example of the reflection state of light that is irradiated on a document from the inside of the first and second light-guiding members held by the first and second holding members of a base via the light emitting face, as viewed from one side in the longitudinal direction.

FIG. 9 is a schematic cross-sectional view as viewed from one side in the longitudinal direction Y, showing an example of a reflection state of light that irradiates the document G from the inside of the first and second light-guiding members 213a and 213b held by the first and second holding members 216a and 216b of the base body 214 via the light emitting face M.

As shown in FIG. 9, the first holding member 216a includes a first holding portion 2161a and a first tilted portion 2162a. The first holding portion 2161a removably holds the first light-guiding member 213a. The first tilted portion 2162a extends from the front end on the light emitting face M side of the first holding portion 2161a so as to reflect light emitted from the light emitting face M of the first light-guiding member 213a and to obliquely widen as the distance from the first light-guiding member 213a increases. Also, the second holding member 216b includes a second holding portion 2161b and a second tilted portion 2162b. The second holding portion 2161b removably holds the second light-guiding member 213b. The second tilted portion 2162b extends from the front end on the light emitting face M side of the second holding portion 2161b so as to reflect light emitted from the light emitting face M of the second light-guiding member 213b and to obliquely widen as the distance from the second light-guiding member 213b increases.

In the present embodiment, the first and second holding portions 2161a and 2161b are each formed to have a quadrangular shape with one open side when viewed from the side in the longitudinal direction Y. That is, the first and second holding portions 2161a and 2161b are each formed by a bottom plate extending in the longitudinal direction Y and two side plates that extend perpendicularly or substantially perpendicularly toward the document G from the two end portions of the bottom plate in the width directions Xa and Xb along light emitting face M that are perpendicular to the longitudinal direction Y. The first and second tilted portions 2162a and 2162b are each formed to obliquely widen as the distance from the first and second light-guiding members 213a and 213b, respectively, increases, when viewed from the side in the longitudinal direction Y.

The quadrangular first and second holding portions 2161a and 2161b with one open side when viewed from the side can have the first and second light-guiding members 213a and 213b, respectively, removably fitted to their inner face. Thus, the first and second holding portions 2161a and 2161b can respectively hold the first and second light-guiding members 213a and 213b reliably while they are in close contact to the inner face of the first and second holding portions 2161a and 2161b. In addition, the first and second holding members 216a and 216b are removably fitted into the first and second support portions 214a and 214b, respectively. Thus, the first and second light-guiding members 213a and 213b can be respectively detached from the first and second holding portions 2161a and 2161b, with the first and second holding members 216a and 216b being respectively detached from the first and second support portions 214a and 214b, and therefore exchangeability of the first and second light-guiding members 213a and 213b can be improved. Also, the first and second reflecting members 215a and 215b are respectively supported by the first and second holding portions 2161a and 2161b. Note that the first and second holding portions 2161a and 2161b themselves may be formed as the first and second reflecting members 215a and 215b, respectively.

For example, the first and second holding portions 2161a and 2161b and the first and second tilted portions 2162a and 2162b may be formed of a metal material such as stainless steel (SUS) or the like. In such a case, the first and second holding portions 2161a and 2161b can also serve as the first and second reflecting members 215a and 215b, respectively. As a result, the inner faces of the first and second holding portions 2161a and 2161b can function as the reflecting face for reflecting light inside the first and second light-guiding members 213a and 213b, respectively. Note that the light source light-guiding member unit 220 is configured by the first and second light-guiding members 213a and 213b, the first and second holding members 216a and 216b and the supporting plate 214d. The supporting plate 214d and the first and second holding members 216a and 216b may be formed in one piece.

Here, a reflection film is attached to the inner faces of the first holding portion 2161a and the first tilted portion 2162a constituting the first holding member 216a, as the first reflecting member 215a. Also, a reflection film is attached to the inner faces of the second holding portion 2161b and the second tilted portion 2162b constituting the second holding member 216b, as the second reflecting member 215b.

Figure 10A:
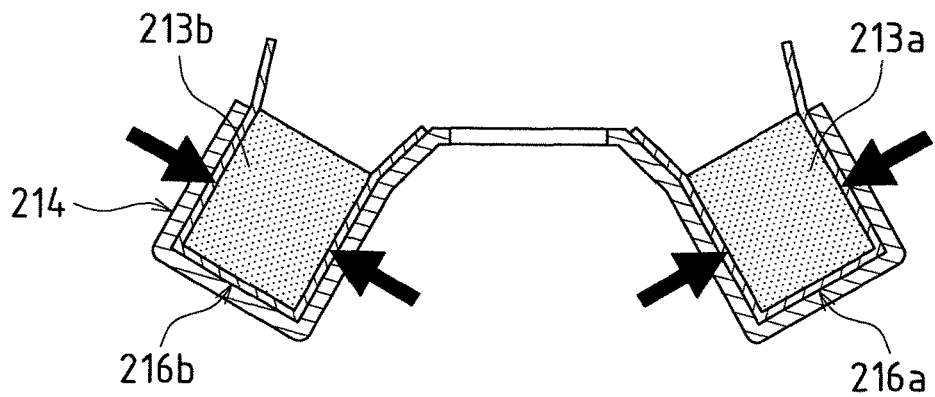
FIGS. 10(a), 10(b) and 10(c) are diagrams illustrating the configuration of the first and second light-guiding members held by the first and second holding members of the base.
Figure 10B:
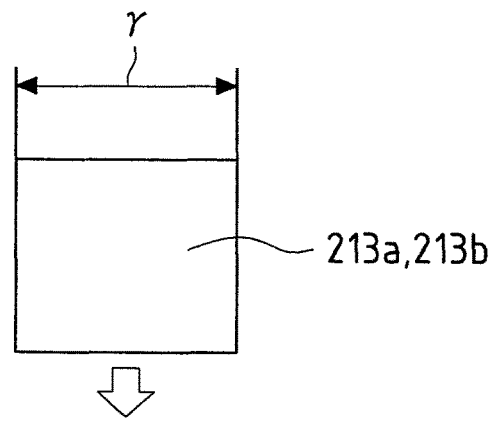
Figure 10C:
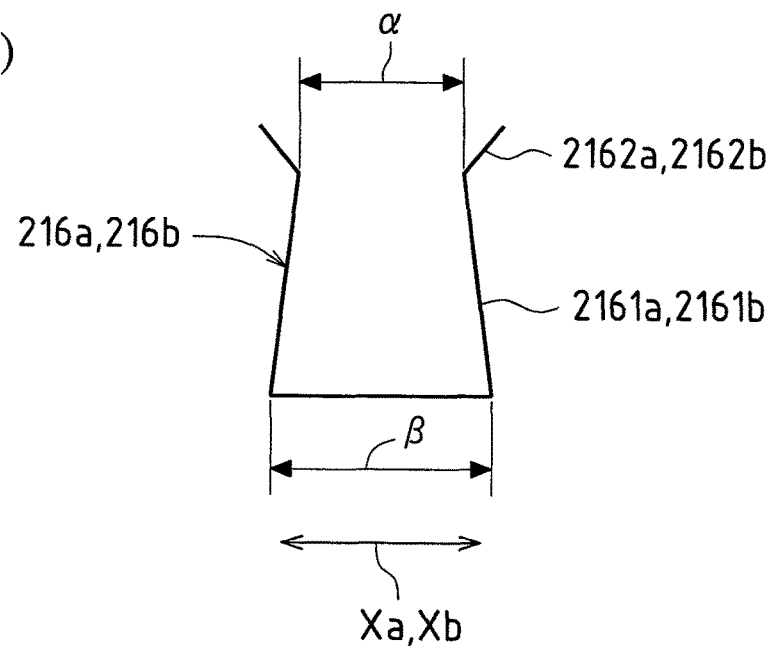

FIG. 10 is a diagram illustrating a configuration of the first and second light-guiding members 213a and 213b held by the first and second holding members 216a and 216b of the base body 214. FIG. 10(a) is a schematic cross-sectional view of the first and second holding members 216a and 216b and the first and second light-guiding members 213a and 213b as viewed from one side in the longitudinal direction Y. FIG. 10(b) is a schematic side view of the first and second light-guiding members 213a and 213b as viewed in the longitudinal direction Y. FIG. 10(c) is a schematic side view of the first and second holding members 216a and 216b as viewed in the longitudinal direction Y. Note that in FIG. 10(b), the first and second light-guiding members 213a and 213b have the same configuration, and therefore they are shown with a single diagram. Also, in FIG. 10(c), the first and second holding members 216a and 216b have the same configuration, and therefore they are shown with a single diagram.

Here, the quadrangular first and second holding portions 2161a and 2161b with one open side when viewed from the side, as shown in FIG. 10(c), each have a length $\alpha$ (specifically, approximately 4.8 mm) in the width directions Xa and Xb at the open end that is shorter than their length $\beta$ (specifically, approximately 5.0 mm) in the width directions Xa and Xb at the base end.

Note that the ratio ($\alpha/\beta$) of the length $\alpha$ in the width directions Xa and Xb at the open end to the length $\beta$ in the width directions Xa and Xb at the base end in the first and second holding portions 2161a and 2161b may be approximately 0.96, for example. When this ratio ($\alpha/\beta$) is too small, attaching and detaching the first and second light-guiding members 213a and 213b to and from the first and second holding portions 2161a and 2161b, respectively, is difficult. On the other hand, as the ratio approaches to 1, the first and second holding portions 2161a and 2161b tend to be in looser contact to the first and second light-guiding members 213a and 213b.

Here, as shown in FIG. 10(b), the first and second light-guiding members 213a and 213b are each formed in a square shape or rectangular shape when viewed from the side in the longitudinal direction Y.

In addition, here, as shown in FIGS. 10(b) and 10(c), in each of the first and second holding portions 2161a and 2161b, the length $\alpha$ in the width directions Xa and Xb at the open end is shorter than a length $\gamma$ (specifically, approximately 5.0 mm) in the width directions Xa and Xb of the first and second light-guiding members 213a and 213b.

Note that the ratio ($\alpha/\gamma$) of the length $\alpha$ in the width directions Xa and Xb at the open end of the first and second holding portions 2161a and 2161b to the length $\gamma$ in the width directions Xa and Xb in the first and second light-guiding members 213a and 213b may be approximately 0.96, for example. When this ratio ($\alpha/\gamma$) is too small, attaching and detaching the first and second light-guiding members 213a and 213b to and from the first and second holding portions 2161a and 2161b, respectively, is difficult. On the other hand, as the ratio approaches 1, the first and second holding portions 2161a and 2161b tend to be in looser contact to the first and second light-guiding members 213a and 213b.

In the present embodiment, the first and second holding portions 2161a and 2161b are each formed by a metal material having elasticity.

The light source unit 210 further includes the first mirror 230 (see FIG. 2). The first mirror 230 is supported by a supporting member not shown in the drawings so as to guide light reflected by the light irradiation face of the document G to the second mirror 203a of the mirror unit 203 via the slit R provided in the joining portion 214c of the base body 214.

With the light source unit 210 described above, the first and second holding portions 2161a and 2161b of the first and second holding members 216a and 216b removably hold the first and second light-guiding members 213a and 213b (here, have the first and second light-guiding members 213a and 213b fitted thereto), respectively. For this reason, when the first and second light-guiding members 213a and 213b need to be replaced, the first and second light-guiding members 213a and 213b can be easily replaced with respect to the first and second holding members 216a and 216b, respectively. Furthermore, in the light source unit 210, the first and second tilted portions 2162a and 2162b of the first and second holding members 216a and 216b each extend from the front end on the light emitting face M side of the first and second holding portions 2161a and 2161b so as to obliquely widen as the distance from the first and second light-guiding members 213a and 213b increases. Therefore, the first and second light-guiding members 213a and 213b can be smoothly fitted into the first and second holding members 216a and 216b along the first and second tilted portions 2162a and 2162b. In addition, in the light source unit 210, the first and second tilted portions 2162a and 2162b of the first and second holding members 216a and 216b respectively reflect light emitted by the light source portions 211a1, 211b1, 211a2 and 211b2 and emitted from the light emitting face M via the first and second light-guiding members 213a and 213b. As a result, light from the light emitting face M can be effectively condensed on the light irradiation face of the document G, thereby making it possible to increase the amount of irradiation light onto the light irradiation face of the document G from the light emitting face M.

Furthermore, in the light source unit 210, the holding faces (the inner faces in this case) of the first and second holding portions 2161a and 2161b serve as the reflecting face on which the light inside the first and second light-guiding members 213a and 213b is reflected. Therefore, due to the inner faces of the first and second holding portions 2161a and 2161b, light loss by reflection inside the first and second light-guiding members 213a and 213b can be respectively suppressed, thereby making it possible to increase the amount of irradiation light onto the light irradiation face of the document G from the light emitting face M by a corresponding amount.

Furthermore, in the light source unit 210, the first and second reflecting members 215a and 215b are provided at the first and second holding portions 2161a and 2161b and the inner faces of the first and second tilted portions 2162a and 2162b, respectively. Consequently, due to the first and second reflecting members 215a and 215b respectively provided at the inner faces of the first and second holding portions 2161a and 2161b, light loss by reflection inside the first and second light-guiding members 213a and 213b can be suppressed. In addition, due to the first and second reflecting members 215a and 215b respectively provided in the inner faces of the first and second tilted portions 2162a and 2162b, light loss by reflection of light emitted from the light emitting face M can be suppressed, thereby increasing the amount of irradiation light onto the light irradiation face of the document G from the light emitting face M by a corresponding amount.

Furthermore, the first and second holding portions 2161a and 2161b respectively hold the first and second light-guiding members 213a and 213b while the first and second light-guiding members 213a and 213b, respectively, are in close contact to the inner faces thereof, thereby suppressing light leak in the light-guiding members 213a and 213b. In this manner, light loss by reflection inside the light-guiding members 213a and 213b can be suppressed.

Furthermore, in the quadrangular first and second holding portions 2161a and 2161b with one open side when viewed from the side, the length α in the width directions Xa and Xb at the open end is shorter than the length β in the width directions Xa and Xb at the base end, and further is shorter than the length γ in the width directions Xa and Xb of the first and second light-guiding members 213a and 213b. In this manner, a force can be applied in the direction of the arrows in FIG. 10(a), and thus the first and second light-guiding members 213a and 213b can be reliably held on the open sides of the first and second holding portions 2161a and 2161b, respectively. Accordingly, the first and second light-guiding members 213a and 213b and the first and second holding portions 2161a and 2161b are in closer contact, respectively, thereby suppressing light leak in the light-guiding members 213a and 213b to a corresponding extent. As a result, light loss inside the light-guiding members 213a and 213b can be further suppressed.

Since the first and second holding portions 2161a and 2161b are each formed by a metal material having elasticity, the first and second light-guiding members 213a and 213b and the first and second holding portions 2161a and 2161b are in closer contact, respectively. In addition, since the first and second holding portions 2161a and 2161b elastically deform when the first and second light-guiding members 213a and 213b are respectively fitted thereto, even though the light-guiding members 213a and 213b are repeatedly replaced, it is possible to reliably hold the light-guiding members 213a and 213b for a long period of time.

Note that at least one of the first light source portions 211a1 and 211a2, or at least one of the second light source portions 211b1 and 211b2 may be formed as a light source group configured from two or more light sources (for example, LED elements).

In the present embodiment, as shown in FIGS. 4, 5 and 8, a reflecting member 2181 is interposed on one side between the light source substrate 2121 and the first and second light-guiding members 213a and 213b, and a reflecting member 2182 is interposed on the other side between the other light source substrate 2122 and the first and second light-guiding members 213a and 213b.

Specifically, the reflecting member 2181 on the one side is attached to the fixing portion 2141 on the one side with one end portion of the supporting plate 214d in the longitudinal direction Y mounted thereto, and the light source substrate 2121 on the one side is arranged on the outside thereof. Also, the reflecting member 2182 on the other side is attached to the fixing portion 2142 on the other side with the other end portion of the supporting plate 214d in the longitudinal direction Y mounted thereto, and the light source substrate 2122 on the other side is arranged on the outer side thereof.

In the present embodiment, the light source unit 210 further includes a radiator member 2191 on one side and a radiator member 2192 on the other side. The radiator member 2191 on the one side is arranged so as to surround the reflecting member 2181 on the one side and the light source substrate 2121 on the one side while being in close contact to the reflecting member 2181 on the one side. The radiator member 2192 on the other side is arranged so as to surround the reflecting member 2182 on the other side and the light source substrate 2122 on the other side while being in close contact to the reflecting member 2182 on the other side.

Specifically, the radiator member 2191 on the one side closely contacts the two side faces in the width direction of the reflecting member 2181 on the one side and is attached to a frame body 210x of the light source unit 210 so as to cover the back face of the one light source substrate 2121. Also, the radiator member 2192 on the other side closely contacts the two side faces in the width direction of the reflecting member 2182 on the other side and is attached to the frame body 210x of the light source unit 210 so as to cover the back face of the light source substrate 2122 on the other side.

The reflecting members 2181 and 2182 and the radiator members 2191 and 2192 are, here, each formed of a metal material such as aluminum. Note that the reflecting member 2181 on the one side is provided with a through hole T1 for allowing light from the first and second light source portions 211a1 and 211b1 on the one side to pass and the reflecting member 2182 on the other side is provided with a through hole T2 for allowing light from the first and second light source portions 211a2 and 211b2 on the other side to pass.

With such a configuration, the reflecting face of the first and second light-guiding members 213a and 213b on the side of the end faces 213a1 and 2131b on the one side in the longitudinal direction Y can be the reflecting face of the reflecting member 2181 on the one side. Accordingly, light (particularly, on optical axes La2 and Lb2) guided into the light-guiding members 213a and 213b from the first and second light source portions 211a2 and 211b2 on the other side via the other end faces 213a2 and 213b2 in the longitudinal direction Y of the first and second light-guiding members 213a and 213b, respectively, is reflected by the reflecting face of the reflecting member 2181 on the one side, thereby further improving reflection efficiency. Also, the reflecting faces of the first and second light-guiding members 213a and 213b on the side of the end faces 213a2 and 213b2 on the other side in the longitudinal direction Y can be the reflecting face of the reflecting member 2182 on the other side. Accordingly, light (particularly, on optical axes La1 and Lb1) guided into the light-guiding members 213a and 213b from the first and second light source portions 211a1 and 211b1 on the one side via the end faces 213a1 and 213b1 on the one side in the longitudinal direction Y of the first and second light-guiding members 213a and 213b, respectively, is reflected by the reflecting face of the reflecting member 2182 on the other side, thereby further improving reflection efficiency. Therefore, reflection loss occurring when the optical axes La1 and Lb1 of the first and second light source portions 211a1 and 211b1 on the one side and the optical axes La2 and Lb2 of the first and second light source portions 211a2 and 211b2 on the other side are reflected inside the light-guiding members 213a and 213b can be further suppressed. The amount of light irradiated onto the light irradiation face of the document G from the light emitting face M can be increased in accordance with the suppressed reflection loss.

Furthermore, with this configuration, the reflecting member 2181 on the one side and the reflecting member 2182 on the other side are each formed by a metal material having a high thermal conductivity, and therefore heat generated by the first and second light source portions 211a1 and 211b1 on the one side and the first and second light source portions 211a2 and 211b2 on the other side can be effectively released by the reflecting members 2181 and 2182.

Furthermore, with the present embodiment, since the radiator member 2191 on the one side provided in close contact to the one reflecting member 2181 surrounds the reflecting member 2181 on the one side and the light source substrate 2121 on the one side, heat generated in the first and second light source portions 211a1 and 211b1 on the one side can be released directly and indirectly via the reflecting member 2181 on the one side. Also, since the radiator member 2192 on the other side provided in close contact to the reflecting member 2182 on the other side surrounds the reflecting member 2182 on the other side and the light source substrate 2122 on the other side, heat generated in the first and second light source portions 211a2 and 211b2 on the other side can be released directly and indirectly via the reflecting member 2182 on the other side. Note that the reflecting members 2181 and 2182 may be configured from a reflection film, a member that supports the reflection film and has a high thermal conductivity such as a metal member.

DESCRIPTION OF REFERENCE NUMERALS

100 Image reading apparatus
210 Light source unit (example of illuminating device)
211a1, 211b1 First and second light source portions on one side
211a2, 211b2 First and second light source portions on the other side
213a, 213b First and second light-guiding members
215a, 215b First and second reflecting members
216a, 216b First and second holding members
2161a, 2161b First and second holding portions
2162a, 2162b First and second tilted portions
D: Image forming apparatus
G: Original as illumination target
M: Light emitting face
Xa, Xb: Width direction
Y: Longitudinal direction
α: Width-direction length at open end of holding portion having sideway U-shape
β: Width-direction length at base end of holding portion having sideway U-shape
γ: Width-direction length of light-guiding member

The invention claimed is:

1. An illuminating device comprising:
   a light-emitting element;
   a substrate on which the light-emitting element is mounted; and
   a light-guiding member,
   wherein the light-emitting element is disposed so as to face an end portion of the light-guiding member in a longitudinal direction, and light from the light-emitting element is made incident upon the end portion in the longitudinal direction,
   wherein the light-guiding member guides the light inside so as to illuminate an illumination target from a light emitting face along the longitudinal direction of the light-guiding member,
   wherein the illuminating device includes a radiator member disposed so as to face the substrate in the longitudinal direction,
   wherein the radiator member is made of a metal material,
   wherein the radiator member is connected to the substrate, and
   wherein the radiator member is connected to a metal member that is a component of the illuminating device.

2. The illuminating device according to claim 1,
   wherein the radiator member and the metal member are connected to each other so as to have a heat conduction path formed by metallic contact.

3. The illuminating device according to claim 1,
   wherein the radiator member is arranged in contact with the substrate.

4. The illuminating device according to claim 1,
wherein the radiator member includes:
a first radiator member arranged so as to face a light-emitting element-mounted surface of the substrate; and
a second radiator member arranged so as to face an opposite surface of the light-emitting element-mounted surface.

5. The illuminating device according to claim 4,
wherein the first radiator member and the second radiator member are arranged so as to make contact with or connected to each other.

6. The illuminating device according to claim 4,
wherein at least one of the first radiator member and the second radiator member is connected to the substrate, and
wherein at least one of the first radiator member and the second radiator member is connected to the metal member that is a component of the illumination device.

7. The illuminating device according to claim 4,
wherein the metal member is at least one member that is a component of a light source light-guiding unit that is configured by the light-guiding member, the first radiator member, the second radiator member and the light-emitting element.

8. The illuminating device according to claim 4,
wherein the metal member is a base to which a light source light-guiding unit is attached, the light source light-guiding unit being configured by the light-guiding member, the first radiator member, the second radiator member and the light-emitting element.

9. The illuminating device according to claim 4,
wherein the metal member is a base to which at least the first radiator member, the second radiator member and the substrate are attached.

10. The illuminating device according to claim 4,
wherein the first radiator member is provided with a through hole for passing the light from the light-emitting element to the end portion of the light-guiding member.

11. The illuminating device according to claim 4,
wherein at least one of the first radiator member and the second radiator member is formed of aluminum.

12. The illuminating device according to claim 4,
wherein the first radiator member is arranged in contact with an end portion of the light-guiding member in the longitudinal direction.

13. The illuminating device according to claim 4,
wherein the first radiator member and the second radiator member are fixed to each other by a fastening member in such a manner as to hold the substrate therebetween.

14. The illuminating device according to claim 4,
wherein the first radiator member includes a reflecting member for reflecting the light from the light-emitting element.

15. The illuminating device according to claim 4,
wherein the first radiator member is provided with a through hole for passing the light from the light-emitting element to the end portion of the light-guiding member.

16. The illuminating device according to claim 1,
wherein a connector is provided on a light-emitting element-mounted surface of the substrate.

17. The illuminating device according to claim 1,
wherein the light-guiding member is held by a holding member made of a metal material.

18. An image reading apparatus comprising the illuminating device according to claim 1.

19. An image forming apparatus comprising the image reading device according to claim 18.

20. The illuminating device according to claim 1,
wherein the light-emitting element is a light-emitting diode.

21. An illuminating device comprising:
a light-emitting element;
a substrate on which the light-emitting element is mounted; and
a light-guiding member,
wherein the light-emitting element is disposed so as to face an end portion of the light-guiding member in a longitudinal direction, and light from the light-emitting element is made incident upon the end portion in the longitudinal direction, wherein the light-guiding member guides the light inside so as to illuminate an illumination target from a light emitting face along the longitudinal direction of the light-guiding member,
wherein the illuminating device includes:
a first radiator member arranged so as to face a light-emitting element-mounted surface of the substrate in the longitudinal direction; and
a second radiator member arranged so as to face an opposite surface of the light-emitting element-mounted surface of the substrate in the longitudinal direction,
wherein at least one of the first radiator member and the second radiator member is connected to the substrate,
wherein the first radiator member and the second radiator member are each made of a metal material,
wherein the first radiator member and the second radiator member are connected to each other so as to have a heat conduction path formed by contact of metal members, and
wherein the first radiator member is provided with a through hole for passing the light from the light-emitting element to the end portion of the light-guiding member.

22. The illuminating device according to claim 21,
wherein the first radiator member and the second radiator member are arranged in contact with each other.

23. The illuminating device according to claim 21,
wherein the second radiator member is arranged in contact with the substrate.

24. The illuminating device according to claim 21, further comprising:
a light source light-guiding unit that is configured by the light-guiding member, the first radiator member, the second radiator member and the light-emitting element; and
a base to which the light source light-guiding unit is attached,
wherein at least one of the first radiator member and the second radiator member serves as an attachment member for attaching the light source light-guiding unit to the base.

25. The illuminating device according to claim 21,
wherein a connector is provided on the light-emitting element-mounted surface of the substrate.

26. The illuminating device according to claim 21,
wherein at least one of the first radiator member and the second radiator member is formed of aluminum.

27. The illuminating device according to claim 21,
wherein the first radiator member is arranged in contact with the end portion of the light-guiding member in the longitudinal direction.

28. The illuminating device according to claim 21,
wherein the first radiator member and the second radiator member are fixed to each other by a fastening member in such a manner as to hold the substrate therebetween.

29. The illuminating device according to claim 21, wherein the light-guiding member is held by a holding member made of a metal material.

30. The illuminating device according to claim 21, wherein the first radiator member includes a reflecting member for reflecting the light from the light-emitting element.

31. An image reading apparatus comprising the illuminating device according to claim 21.

32. An image forming apparatus comprising the image reading device according to claim 31.

33. The illuminating device according to claim 21,
wherein the light-emitting element is a light-emitting diode.

\* \* \* \* \*